Feb. 27, 1962  W. J. O'BRIEN  3,022,669
RATE SENSITIVE THERMOCOUPLE
Filed Nov. 25, 1957
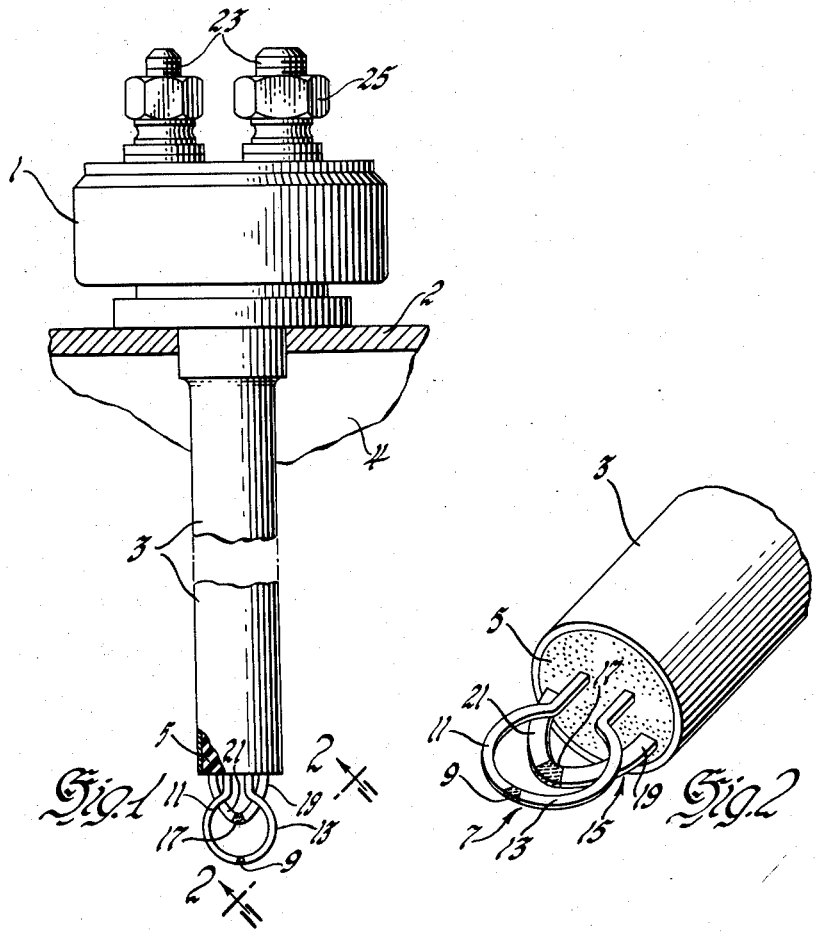
INVENTOR.
William J. O'Brien
BY
Paul Fitzpatrick
ATTORNEY.

United States Patent Office 3,022,669
Patented Feb. 27, 1962

3,022,669
RATE SENSITIVE THERMOCOUPLE
William J. O'Brien, Indianapolis, Ind., assignor to General Motors Corporation, Detroit, Mich., a corporation of Delaware
Filed Nov. 25, 1957, Ser. No. 698,466
2 Claims. (Cl. 73—359)

This invention relates to thermocouples and more particularly to rate sensitive thermocouples for measuring the temperaturs of hot gases subject to rapid temperature changes.

In many high temperature devices, such as in jet engines, it is highly desirable that a temperature sensing means be provided that will be substantially instantaneously responsive to sudden changes in temperature due to changes in operating conditions of the device or engine especially in gas turbines. This instantaneous response is necessary because generally the engine is operated near its critical temperature and even a relatively brief period of exposure of the vital parts to an excess temperature can cause serious damage to the engine.

It has been found that the response characteristics of temperature sensing elements are a function of their physical dimensions, and in the case of a thermocouple the thickness of the bimetallic element junction is proportional to the time constant. In order to provide a "fast" thermocouple, that is one with a small time constant, it is necessary to utilize a thermocouple with a comparatively small physical thickness. However, due to the high temperatures involved and the extreme velocities of gases impinging on the thermocouple a small thermocouple junction requires frequent replacement or gives unreliable service as the thermocouple ages. Therefore, it would be desirable to utilize a thermocouple of sufficient size to minimize the effects of high temperature corrosion and to enable the thermocouple to withstand the high velocities found in turbine engines.

One object of the invention is to provide a thermocouple apparatus that has the response characteristics of a very small or fast thermocouple and yet physically is large enough to be rugged and have reliable long life.

Another object of the invention is to provide a thermocouple apparatus in which the difference in response rates of two fairly large different sized thermocouples is utilized to provide an output signal resembling that of a very fast small thermocouple.

Other objects of the invention will become apparent by reference to the following detailed description and the accompanying drawings in which:

FIGURE 1 is a view of a thermocouple probe;

FIGURE 2 is an enlarged elevational view taken on the line 2—2 of FIGURE 1;

FIGURE 3 is a schematic electrical circuit diagram showing one way the thermocouple can be used; and FIGURE 4 shows response characteristics of various sized thermocouples.

Referring to the drawings and particularly to FIGURES 1 and 2, the thermocouple consists of a head portion 1 having a probe 3 extending through a wall 2 into a gas duct 4. The probe 3 is hollow and is filled with suitable insulation 5. The leads of two independent thermocouples are embedded in the insulation 5. The first or fast thermocouple 7 is of the large loop type having a small junction 9 connecting lead wires 11 and 13. The second or slow spade type thermocouple has a large mass junction 17 connecting lead wires 19 and 21. The thermocouple leads of each pair are made of any suitable dissimilar thermocouple metals such as alumel, chromel, etc. The lead wires extend through the thermocouple body and are connected to connector studs such as studs 23, each of the leads 11, 13, 19, 21 connected to a different stud. Only two of the four studs are shown in FIGURE 1. Nuts 25 are provided to hold connecting wires on the studs 23.

Referring to FIGURE 3, which shows a schematic electrical diagram of an embodiment incorporating the invention, the fast or large loop thermocouple 7 has its leads connected directly to an electronic amplifier 37 which may be of any suitable type, but which should preferably be of the type responsive to changes in a D.C. voltage such as is produced by a thermocouple. The outputs of both the fast thermocouple 7 and the slow thermocouple 15 are connected to oppose each other and are fed into a second amplifier 39 similar to amplifier 37. Because the output signals of the two thermocouples are opposed, the input and, hence, the output of amplifier 39 will represent the difference between the signals or voltages of the two thermocouples. Thus, when the thermocouple apparatus is in a steady state condition, that is, with the temperature in the gas duct 4 constant, the signals produced by the fast and slow thermocouples will be equal and thus will cancel each other, and the output from amplifier 39 will be zero.

The output from amplifier 37 is connected across a a portion of an output load resistor 41 and the output from amplifier 39 is connected to cross the remainder of the resistor 41. The voltage across the whole resistor 41 is measured between points 43 and 45 and will vary according to the algebraic sum of the instantaneous voltage of the fast thermocouple 7 and the difference between the voltages with the fast and slow thermocouples.

Referring to FIGURE 4 in which there are time response curves of various thermocouples plotted, FIGURE 4 shows the output voltage vs. time curves for different sized thermocouples, the significance of curves of this type are more fully discussed in the patent to Vickers 2,755,999. The three solid line curves 27, 29 and 31 are the characteristic curves of three different rate or sized thermocouples. Curve 27 is that of a large mass slow rate thermocouple having a time constant of 5 units, that is, a thermocouple that will have reached 63.2% of its total temperature change in a step changed system in five time units. Curve 29 shows the response of a thermocouple having a time constant of three time units and curve 31 that of a thermocouple with a 1.9 time unit.

Curve 31 is a desirable response curve of a thermocouple used in a gas turbine construction since its time constant is relatively low. However, a thermocouple having a response curve like curve 31 would have to be so small and hence delicate that it would have a very short life and be unreliable in service. By utilizing the invention in a system such as shown in FIGURE 3, an equivalent response curve 33 can be obtained from two larger thermocouples having response curves 27 and 29. Dashed curve 34 represents the difference between the output voltages of the relatively fast thermocouple 7 and the relatively slow thermocouple 15. This curve 34 describes the changes in the input and output voltages of amplifier 39 with a sudden increase in temperature of the medium surrounding the thermocouple probes. Dashed curve 33 represents the algebraic sum of the output voltage of the fast thermocouple 7 and the difference between the voltages of the fast and slow thermocouples, that is it represents curve 34 added to curve 29. It will be seen that initially curve 33 rises very much like curve 31 but then slightly overshoots the 100% mark and then gradually returns to the 100% line. At the characteristic time point, that is the 63.2% point, the curve 33 is almost exactly the same as that of a very fast small thermocouple of 1.9 time units providing a response curve 31.

The output across the load resistor in FIGURE 3 can be used any number of ways such as in a fuel regulator control which acts to maintain the temperature of the gases in the engine at a desired value or to prevent them from exceeding a desired value. The signal from the slow thermocouple 15 can be connected to an indicator 35 to provide a direct temperature reading.

The dual junction thermocouple can be utilized in other ways than that shown in FIGURE 3, the circuit of FIGURE 3 showing only a single embodiment. Other circuits and constructions employing other modifications of the thermocouple construction will be apparent and the principles of the invention can be carried out in these other forms without departing from the spirit and scope of this invention.

What is claimed is:

1. A thermocouple system for measuring changes in the temperature of a medium including a pair of adjacent thermocouples having hot junctions equally exposed to said medium, said thermocouple junctions having different masses to provide different response rates, means connected to said thermocouples for producing a first output signal proportional to the instantaneous difference between the output voltages of said thermocouples, means connected to the thermocouple having the fastest response rate for producing a second output signal proportional to the instantaneous voltage of said one thermocouple, and means for combining the said first and second output signals to produce a final output signal equivalent to the output voltage of a thermocouple having time constant less than the time constant of the fastest response thermocouple.

2. A thermocouple system for measuring changes in the temperature of a medium including a pair of adjacent thermocouples having hot junctions equally exposed to said medium, said thermocouple junctions having different masses to provide different response rates, first amplifier means connected to said thermocouples for producing a first output signal proportional to the instantaneous difference between the output voltages of said thermocouples, second amplifier means connected to the faster of said thermocouples for producing a second output signal proportional to the instantaneous voltage of said faster thermocouple, and means for combining the said first and second output signals to produce a final output signal equivalent to the output voltage of a thermocouple having a time constant less than the time constant of the faster response thermocouple.

References Cited in the file of this patent

UNITED STATES PATENTS

| | | |
|---|---|---|
| 880,272 | Bristol | Feb. 25, 1908 |
| 1,189,785 | Brown | July 4, 1916 |
| 2,054,120 | De Florez | Sept. 15, 1936 |
| 2,660,883 | Wyczalek | Dec. 1, 1953 |